United States Patent
Ampatzidis et al.

(10) Patent No.: US 11,710,214 B2
(45) Date of Patent: Jul. 25, 2023

(54) CLOUD-BASED FRAMEWORK FOR PROCESSING, ANALYZING, AND VISUALIZING IMAGING DATA

(71) Applicant: University of Florida Research Foundation, Incorporated, Gainesville, FL (US)

(72) Inventors: Ioannis Ampatzidis, Gainesville, FL (US); Victor H. Meirelles Partel, Gainesville, FL (US); Lucas Fideles Costa, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 17/907,695

(22) PCT Filed: Apr. 21, 2021

(86) PCT No.: PCT/US2021/028298
§ 371 (c)(1),
(2) Date: Sep. 29, 2022

(87) PCT Pub. No.: WO2021/216637
PCT Pub. Date: Oct. 28, 2021

(65) Prior Publication Data
US 2023/0124398 A1 Apr. 20, 2023

Related U.S. Application Data

(60) Provisional application No. 63/199,961, filed on Feb. 5, 2021, provisional application No. 63/013,606, filed on Apr. 22, 2020.

(51) Int. Cl.
*G06K 9/00* (2022.01)
*G06T 3/40* (2006.01)
(Continued)

(52) U.S. Cl.
CPC ............ *G06T 3/4038* (2013.01); *G06F 18/40* (2023.01); *G06T 1/20* (2013.01); *G06T 7/38* (2017.01);
(Continued)

(58) Field of Classification Search
CPC ........ G06V 10/16; G06V 10/20; G06V 10/24; G06V 10/25; G06V 10/255; G06V 10/40;
(Continued)

(56) References Cited

U.S. PATENT DOCUMENTS 10,249,047 B2 * 4/2019 Jia .............................. G06T 7/20
11,101,876 B2 * 8/2021 Kargieman ............ G06V 20/13
(Continued)

FOREIGN PATENT DOCUMENTS

CN 108875620 A 11/2018
CN 110852282 A 2/2020

OTHER PUBLICATIONS

International Search Report and Written Opinion for International Application No. PCT/US2021/028298, dated Apr. 21, 2021, (11 pages), United States Patent and Trademark Office, US.
(Continued)

*Primary Examiner* — Eric Rush
(74) *Attorney, Agent, or Firm* — Alston & Bird LLP

(57) ABSTRACT

Embodiments of the present disclosure provide methods, apparatus, systems, computing devices, computing entities, and/or the like for detecting objects located in an area of interest. In accordance with one embodiment, a method is provided comprising: receiving, via an interface provided through a general instance on a cloud environment, imaging data comprising raw images collected on the area of interest; upon receiving the images: activating a central processing unit (CPU) focused instance on the cloud environment and processing, via the image, the raw images to generate an
(Continued)

image map of the area of interest; and after generating the image map: activating a graphical processing unit (GPU) focused instance on the cloud environment and performing object detection, via the image, on a region within the image map by applying one or more object detection algorithms to the region to identify locations of the objects in the region.

21 Claims, 9 Drawing Sheets

(51) Int. Cl.
| | | |
|---|---|---|
| *G06V 10/82* | (2022.01) | |
| *G06V 20/17* | (2022.01) | |
| *G06V 20/10* | (2022.01) | |
| *G06T 7/38* | (2017.01) | |
| *G06T 7/00* | (2017.01) | |
| *G06T 7/70* | (2017.01) | |
| *G06V 10/25* | (2022.01) | |
| *G06V 10/96* | (2022.01) | |
| *G06V 10/94* | (2022.01) | |
| *G06V 10/10* | (2022.01) | |
| *G06F 18/40* | (2023.01) | |
| *G06T 1/20* | (2006.01) | |

(52) U.S. Cl.
CPC .................. *G06T 7/70* (2017.01); *G06T 7/97* (2017.01); *G06V 10/16* (2022.01); *G06V 10/25* (2022.01); *G06V 10/82* (2022.01); *G06V 10/94* (2022.01); *G06V 10/945* (2022.01); *G06V 10/95* (2022.01); *G06V 10/96* (2022.01); *G06V 20/17* (2022.01); *G06V 20/188* (2022.01); *G06T 2207/20104* (2013.01); *G06T 2207/30188* (2013.01); *G06V 2201/07* (2022.01)

(58) Field of Classification Search
CPC ........ G06V 10/70; G06V 10/72; G06V 10/75; G06V 10/764; G06V 10/82; G06V 10/94; G06V 10/945; G06V 10/95; G06V 10/955; G06V 10/96; G06V 20/10; G06V 20/13; G06V 20/17; G06V 20/182; G06V 20/188; G06V 20/64; G06V 20/68; G06V 2201/07; G06T 1/20; G06T 5/50; G06T 7/30; G06T 7/38; G06T 7/70; G06T 7/97; G06T 2207/10032; G06T 2207/20101; G06T 2207/20104; G06T 2207/20221; G06T 2207/30181; G06T 2207/30188; G06T 2207/30242; G06F 15/16; G06F 15/161; G06F 15/177; G06F 18/40; H04L 67/10; H04L 67/1001; H04L 67/10015; H04L 67/1004; H04L 67/12; H04L 67/2866
USPC ........ 382/100, 103, 108–110, 159, 181, 224, 382/284, 291, 293–295, 302–305, 307, 382/325; 345/629, 630, 651, 655; 700/2–4, 8, 9, 11, 19, 20; 708/1–3, 104; 709/201–203, 219; 712/28–32; 718/1, 718/100, 102, 106
See application file for complete search history.

(56) References Cited

U.S. PATENT DOCUMENTS

| | | | |
|---|---|---|---|
| 11,345,040 | B2 * | 5/2022 | Oleynik ............. G05B 19/4183 |
| 2002/0140924 | A1 | 10/2002 | Wangler et al. |
| 2012/0311156 | A1 | 12/2012 | DeJana et al. |
| 2013/0057560 | A1 | 3/2013 | Chakraborty et al. |
| 2016/0171682 | A1 | 6/2016 | Abedini et al. |
| 2017/0041550 | A1 | 2/2017 | Swanson |
| 2017/0112116 | A1 | 4/2017 | Ji et al. |
| 2017/0250751 | A1 | 8/2017 | Kargieman et al. |
| 2018/0330247 | A1 | 11/2018 | Cohen |
| 2019/0150357 | A1 | 5/2019 | Wu et al. |
| 2019/0303648 | A1 * | 10/2019 | Zhai .................... G06V 10/764 |
| 2020/0394804 | A1 * | 12/2020 | Barton .................. G06V 10/82 |
| 2022/0250108 | A1 | 8/2022 | Ampatzidis et al. |

OTHER PUBLICATIONS

International Search Report and Written Opinion for International Application No. PCT/US2022/015183, dated Feb. 4, 2022, (12 pages), United States Patent and Trademark Office, US.

Palm, Rasmus Berg et al. "CloudScan—A Configuration-Free Invoice Analysis System Using Recurrent Neural Networks," *2017 14th IAPR International Conference on Document Analysis and Recognition (ICDAR)*, vol. 1, IEEE, Aug. 24, 2017 (Year: 2017), arXiv preprint arXiv: 1708.07403v1 [cs.CL] Aug. 24, 2017, (8 pages). Available online: <URL: https: //arxiv.org/pdf/1708.07403.pdf>.

Search Report and Written Opinion for Spanish Application No. 202290072, dated Mar. 30, 2023, (18 pages), Spanish Patent and Trademark Office, Madrid, Spain.

* cited by examiner

CLOUD-BASED FRAMEWORK FOR PROCESSING, ANALYZING, AND VISUALIZING IMAGING DATA

CROSS REFERENCE TO RELATED APPLICATIONS

This application is a National Stage Application, filed under 35 U.S.C. § 371, of International Application No. PCT/US2021/028298, filed Apr. 21, 2021, which claims the benefit of the U.S. Provisional Patent Application Ser. No. 63/013,606, filed Apr. 22, 2020, U.S. Provisional Patent Application Ser. No. 63/199,961, filed Feb. 5, 2021, the contents of all of which are hereby incorporated by reference in their entirety.

STATEMENTS OF SUPPORT

This invention was made with government support under AP19PPQS&T00C130 awarded by The United States Department of Agriculture, APHIS. The government has certain rights in the invention.

This invention was made whole or in part from a sub-award received from the Florida Department of Agriculture and Consumer Services' Specialty Crop Programs derived from state support provided by the United States Department of Agriculture, Agricultural Marketing Service.

TECHNOLOGICAL FIELD

Embodiments of the present disclosure generally relate to systems and methods utilizing a cloud-based framework for processing, analyzing, and visualizing imaging data.

BACKGROUND

Precision agriculture aims to optimize resource usage to achieve enhanced agricultural production and reduced environmental impacts. Assessment of crop growth and timely strategic responses to crop production variations are fundamental challenges in precision agriculture. For instance, in tree crops, measurements of individual tree parameters, such as tree canopy characteristics, are essential to monitor tree growth and optimize orchard management. Detecting, counting, and assessing individual trees in orchards allows for the selection of appropriate horticultural practices such as, for example, the timely application of chemicals and precision irrigation scheduling. Hence, the development of low-cost high-throughput phenotyping tools for tree crops is critical in many precision agriculture applications.

However, traditional sensing technologies for evaluating field phenotypes typically rely on manual sampling and are often very labor-intensive and time-consuming, especially when covering large areas. Also, field surveys for pest and disease detection, plant inventory, and plant health assessments can be expensive, labor-intensive, and time-consuming. Thus, remote sensing techniques have been widely applied in precision agriculture for tree crops. A variety of sensing platforms have been used for this purpose, including red/green/blue (RGB), multispectral, and hyperspectral imaging, as well as Light Detection and Ranging (LiDAR). Accordingly, sensing platforms may entail using apparatuses such as small unmanned aerial vehicles (UAVs), aircraft, satellites, and/or ground devices equipped with such sensors to simplify the surveying procedure, decrease data collection time, and reduce cost. For instance, sensing platforms allow growers to monitor crop health status, estimate plant water needs, detect diseases and pests, and quantify pruning strategies and impacts. They represent a low-cost method for image acquisition in high spatial and temporal resolution, and as a result, have been increasingly used for agricultural applications.

Furthermore, artificial intelligence has also been increasingly used in remote sensing of image data. This has been due to the increasing access to large amounts of image data gathered by imaging platforms, allowing artificial intelligence to play an essential role in processing all these data to obtain valuable information. However, the adoption of imaging platform technologies in fields such as specialty crops has been low. The main reasons have been based at least in part on two fronts. First, the data processing and analysis to generate accurate and useful information can be very complex and time-consuming. Second, commercially available software typically only provides limited practical information for many applications. Accordingly, a need exists in the industry that overcomes these two shortcomings and allows for increased data processing efficiency, data security, scalability, and reduced cost.

BRIEF SUMMARY

In general, embodiments of the present disclosure provide methods, apparatus, systems, computing devices, computing entities, and/or the like for detecting a plurality of objects located in an area of interest. In accordance with one aspect of the present disclosure, a method is provided. In various embodiments, the method comprises: receiving, via an interface provided through a general instance on a cloud environment, imaging data comprising a plurality of raw images collected on the area of interest; upon receiving the plurality of raw images: activating, via the general instance, a central processing unit (CPU) focused instance on the cloud environment based at least in part on a CPU-focused machine configuration image comprising software for image stitching; upon activating the CPU-focused instance, processing, via the CPU-focused instance, the plurality of raw images to stitch together each of the raw images of the plurality of raw images to generate an image map of the area of interest; and upon completion of generating the image map, closing, via the general instance, the CPU-focused instance on the cloud environment; and after generating the image map: activating, via the general instance, a graphical processing unit (GPU) focused instance on the cloud environment based at least in part on a GPU-focused machine configuration image comprising software for performing processing algorithms; upon activating the GPU-focused instance, performing object detection, via the GPU-focused instance, on at least a region within the image map by applying one or more object detection algorithms to the region of the image map to identify locations of the plurality of objects in the region of the image map; and upon completion of detecting the plurality of objects for the region, closing, via the general instance, the GPU-focused instance on the cloud environment; and performing one or more cloud-based actions based at least in part on the plurality of objects detected for the region within the image map.

In accordance with another aspect of the present disclosure, an apparatus operating within a general instance of a cloud environment is provided. In various embodiments, the apparatus includes at least one processor and at least one memory, including program code. The at least one memory and the program code are configured to, with the at least one processor, cause the apparatus to at least: receive, via an interface, imaging data comprising a plurality of raw images collected on the area of interest; upon receiving the plurality of raw images: activate a central processing unit (CPU) focused instance on the cloud environment based at least in part on a CPU-focused machine configuration image comprising software for image stitching, wherein upon activating the CPU-focused instance, the CPU-focused instance processes the plurality of raw images to stitch together each of the raw images of the plurality of raw images to generate an image map of the area of interest; and upon completion of generating the image map, close the CPU-focused instance on the cloud environment; and after the image map is generated: activate a graphical processing unit (GPU) focused instance on the cloud environment based at least in part on a GPU-focused machine configuration image comprising software for performing processing algorithms, wherein upon activating the GPU-focused instance, the GPU-focused instance performs object detection on at least a region within the image map by applying one or more object detection algorithms to the region of the image map to identify locations of the plurality of objects in the region of the image map; and upon completion of detecting the plurality of objects for the region, close the GPU-focused instance on the cloud environment; and perform one or more cloud-based actions based at least in part on the plurality of objects detected for the region within the image map.

In accordance with yet another aspect of the present disclosure, a computer program product is provided. In various embodiments, the computer program product includes a non-transitory computer storage medium having instructions stored therein. The instructions being configured to cause one or more processors operating within a general instance of a cloud environment to at least perform operations configured to: receive, via an interface, imaging data comprising a plurality of raw images collected on the area of interest; upon receiving the plurality of raw images: activate a central processing unit (CPU) focused instance on the cloud environment based at least in part on a CPU-focused machine configuration image comprising software for image stitching, wherein upon activating the CPU-focused instance, the CPU-focused instance processes the plurality of raw images to stitch together each of the raw images of the plurality of raw images to generate an image map of the area of interest; and upon completion of generating the image map, close the CPU-focused instance on the cloud environment; and after the image map is generated: activate a graphical processing unit (GPU)-focused instance on the cloud environment based at least in part on a GPU-focused machine configuration image comprising software for performing processing algorithms, wherein upon activating the GPU-focused instance, the GPU-focused instance performs object detection on at least a region within the image map by applying one or more object detection algorithms to the region of the image map to identify locations of the plurality of objects in the region of the image map; and upon completion of detecting the plurality of objects for the region, close GPU-focused instance on the cloud environment; and perform one or more cloud-based actions based at least in part on the plurality of objects detected for the region within the image map.

In particular embodiments, the object detection on the region within the image map is performed by: preprocessing the image map to reduce variation in the image map resulting from capturing the plurality of raw images; applying a first object detection algorithm of the one or more object detection algorithms to identify initial locations of the plurality of objects in the region of the image map; identifying one or more object patterns in the image map; analyzing the one or more object patterns to identify one or more false positives in the initial locations of the plurality of objects; removing the one or more false positives from the initial locations of the plurality of objects; and after removing the one or more false positives from the initial locations of the plurality of objects, applying a second object detection algorithm of the one or more object detection algorithms to each of the one or more object patterns to identify the locations of the plurality of objects. In addition, in particular embodiments, input is received, via an interface, originating from a user, wherein the input comprises at least one of the region within the image map, an object spacing identifying an average space between objects located in the region, or one or more blank areas found in the region to be skipped by the one or more object detection algorithms.

In particular embodiments, the area of interest comprises a tree grove, the plurality of objects comprises a plurality of trees, and the one or more object patterns comprise one or more rows of trees. Accordingly, in some embodiments, the one or more cloud-based actions may comprise: generating processed data for the plurality of trees, the processing data comprising at least one of a total number of trees for the plurality of trees, one or more tree gap counts, an average value of tree heights, a tree height for one or more of the plurality of trees, a canopy area estimation for one or more of the plurality of trees, a yield estimation of fruit for one or more of the plurality of trees, an estimation of tree ages for one or more of the plurality of trees, an estimation of tree health for one or more of the plurality of trees, estimated nutrient concentrations for one or more of the plurality of trees, or a fertility map based at least in part on estimated nutrient concentrations for the plurality of trees; and providing at least a portion of the processing data for display via the interface on a user device. In these embodiments, the one or more cloud-based actions may also comprise: receiving an input indicating a selection of the region from a user via the user device; and responsive to receiving the input indicating the selection of the region, providing a map of the region for display via the interface on the user device, the map displaying the plurality of trees detected for the region. Further, in some embodiments, the one or more cloud-based actions may comprise: generating an application map identifying an application rate for at least the region within the image map; and downloading the application map to a smart sprayer system configured to use the application map to control the flow of a liquid being applied to the plurality of trees in the region.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
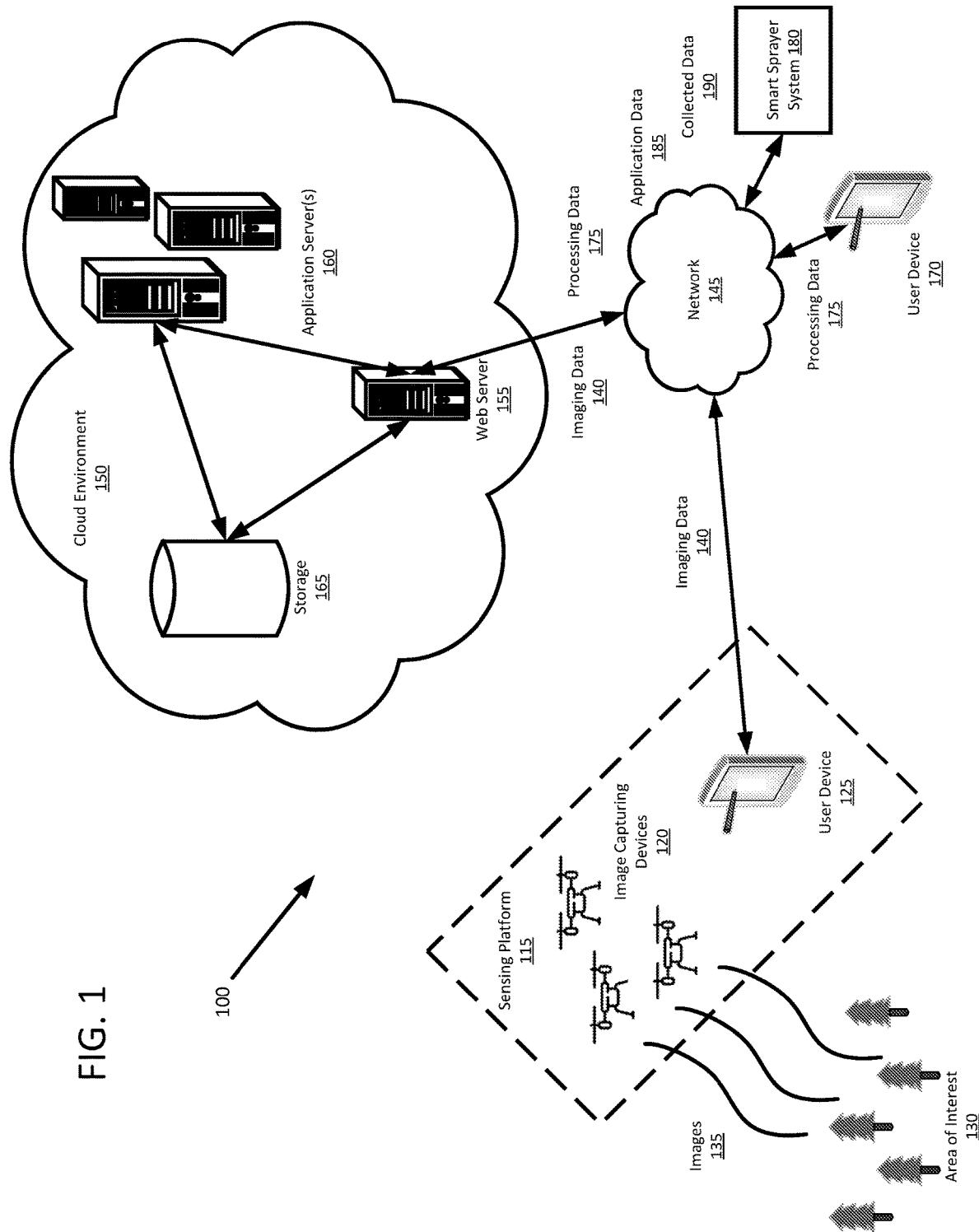
FIG. 1 is a diagram of a system architecture that can be used in conjunction with various embodiments of the present disclosure.

Various embodiments of the present disclosure now will be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense unless otherwise indicated. The terms "illustrative" and "exemplary" are used to be examples with no indication of quality level. Like numbers refer to like elements throughout.

I. Computer Program Products, Systems, Methods, and Computing Entities

Embodiments of the present disclosure may be implemented in various ways, including computer program products that comprise articles of manufacture. Such computer program products may include one or more software components, including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripted language, a database query or search language, and/or a report writing language. In one or more example embodiments, a software component comprising instructions in one of the foregoing examples of programming languages may be executed directly by an operating system or other software components without being first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entire hardware embodiment, an entirely computer program product embodiment, and/or an embodiment that comprises a combination of computer program products and hardware performing specific steps or operations.

Embodiments of the present disclosure are described below with reference to block diagrams and flowchart illustrations. Thus, it should be understood that each block of the block diagrams and flowchart illustrations may be implemented in the form of a computer program product, an entire hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

a. Exemplary System Architecture

FIG. 1 provides an illustration of a system architecture 100 that may be used in accordance with various embodiments of the disclosure. Here, a sensing platform 115 is used for image acquisition of an area of interest 130 that includes one or more devices 120 configured to acquire the images 135 of the area of interest 130. For instance, the area of interest 130 may be a tree grove, and the one or more image capturing devices 120 may be quadcopter UAVs such as, for example, a Matrice 210 or DJI Phantom 4 Pro+ used for capturing aerial images of the tree grove. The system architecture 100 is shown in FIG. 1 with a sensing platform 115 using UAVs. However, those of ordinary skill in the art should understand that other sensing platforms 115, including other types of image capturing devices 120 can be used in other embodiments depending on the application (e.g., precision agriculture) for which images are being gathered.

Accordingly, the image capturing devices 120 in the sensing platform 115 uses one or more sensors for capturing the images 135, such as, for example, multispectral cameras, RGB cameras, and/or the like. For instance, images may be acquired on five bands: (i) blue, (ii) green, (iii) red, (iv) red edge, and (v) near-infrared. Further, the imaging resolution may vary depending on the application, such as, for example, 5,280×3,956 pixels (21 megapixels) or 5,472×3,648 (19.96 megapixels).

In addition, the sensing platform 115 may include a user device 125 for controlling the image capturing devices 120. Here, the user device 125 may include some type of application used for controlling the devices 120. For example, Pix4DCapture software may be utilized in particular instances in which aerial images 135 are being collected for flight planning and mission control. Accordingly, the sensing platform 115 negotiates the area of interest 130 (e.g., negotiates to have the UAVs fly over the tree grove) and captures one or more images 135 that can then be uploaded to a cloud environment 150. Here, images 135 are captured using the image capturing devices and collected on the user device 125. The user device 125 may then access the cloud environment 150 via a website over a network 145 such as the Internet or cellular communication and upload the imaging data 140.

The cloud environment 150 may be composed of one of several different cloud-based computing solutions that are privately and/or commercially (e.g., publicly) available, such as Amazon Web Services (AWS) for example, that provides a highly reliable and scalable infrastructure for deploying cloud-based applications. In particular embodiments, the cloud environment 150 provides multiple types of instances, machines with different configurations for specific software applications, and allows for the use of multiple similar machines, the creation of instance images, and the copying of configurations and software applications on an instance.

Here, the cloud environment 150 may include a web server 155 providing one or more websites (e.g., one or more webpages) to serve as a user interface through which remote parties may access the cloud environment 150 to upload imaging data 140 for processing. In addition, the webserver 155 may provide one or more websites (e.g., one or more webpages) through which remote parties may access imaging data 140 and process and analyze the data 140 to produce desired information (as further discussed herein). Although the user interface described herein is provided via one or more web sites through a web server 155, those of ordinary skill in the art should understand that a user interface may be provided through other forms in other embodiments such as, for example, a conventional interface, a graphical user interface (GUI), form-based interface, application programming interface, and/or the like. Accordingly, a general instance (e.g., cloud instance, virtual server instance, and/or the like) may be used in various embodiments as a main application control machine that serves as the interface to the cloud environment 150 and controls other instances in the process by sending commands between instances and the cloud environment 150.

Furthermore, the cloud environment 150 may include one or more application servers 160 on which services may be available for performing desired functionality such as processing imaging data 140 to produce desired image map(s) and corresponding information gathered from the map(s). For instance, a service may be available in various embodiments that uses a stitching engine to stitch the collected raw images (imaging data 140) that have been uploaded into one or more image maps (e.g., one or more orthomosaic maps). For example, in an instance in which the imaging data 140 includes aerial images, the service may make use of the stitching engine Pix4Dmapper software configured to stitch and geometrically correct the collected images into one or more aerial maps that accurately represent the area of interest 130. Here, a map may be generated for each of the bands that are then combined to create one or more aerial maps such as RGB map(s), RNB map(s), and/or the like. For example, an RNB map containing a near-infrared channel may be used in various applications such as precision agriculture. Such a map may show a visually better contrast between vegetation (e.g., plants and/or trees) surroundings and, therefore, may provide a better detection rate.

In addition, a service may be available for processing image maps to detect objects found in the maps, as well as identify desired parameters for the objects, to produce processing data 175. As discussed further herein, this service may employ one or more object detection algorithms in various embodiments to detect the objects and corresponding parameters of the objects found in the image maps. Here, the object detection algorithms may utilize artificial intelligence (e.g., one or more machine learning models). Multiple algorithms may be used during the detection process to improve object and parameter detection.

Accordingly, in various embodiments, the service for processing the imaging data 140 may employ the first instance for CPU intensive usage (e.g., a CPU-focused instance), and the service utilizing the one or more object detection algorithms may employ a second, different instance for GPU intensive usage (e.g., a GPU-focused instance). For scalability and parallel processing, both instances may work by creating an image for each process being executed for the imaging data 140, so that multiple maps and corresponding parameters information (processing data 175) can be generated at the same time.

Finally, in particular embodiments, the cloud environment 150 may include non-volatile data storage 165 such as a Hard Disk Volume storage unit for storing uploaded imaging data 140, as well as processing data 175 generated from the imaging data 140. Further, a remote user may use a device 170 to access the cloud environment 150 via the web server 155 to use the available services for processing image maps to generate desired processing data 175, as well as view the resulting processing data 175.

Furthermore, in particular embodiments, the cloud environment 150 may be in communication with one or other systems to allow for the exchange of application, processing, and/or collected data as detailed further herein. For instance, in some embodiments, the cloud environment 150 may be in communication with a smart sprayer system 180. Accordingly, the smart sprayer system 180 may comprise hardware and/or software configured for data collection, processing, and control of a sprayer for an agricultural application (e.g., spraying a tree grove). For example, in particular embodiments, the smart sprayer system 180 includes a Light Detection and Ranging (LiDAR) sensor to collect three-dimensional (3D) spatial data of a tree grove, one or more cameras (e.g., RGB cameras) producing images that can be used for applications such as tree or non-tree classification, fruit detection and/or count, fruit size estimation, and/or the like, and a Global Positioning System (GPS) for measuring position and speed. Accordingly, one or more of these various components may be resident on the sprayer.

Figure 2:
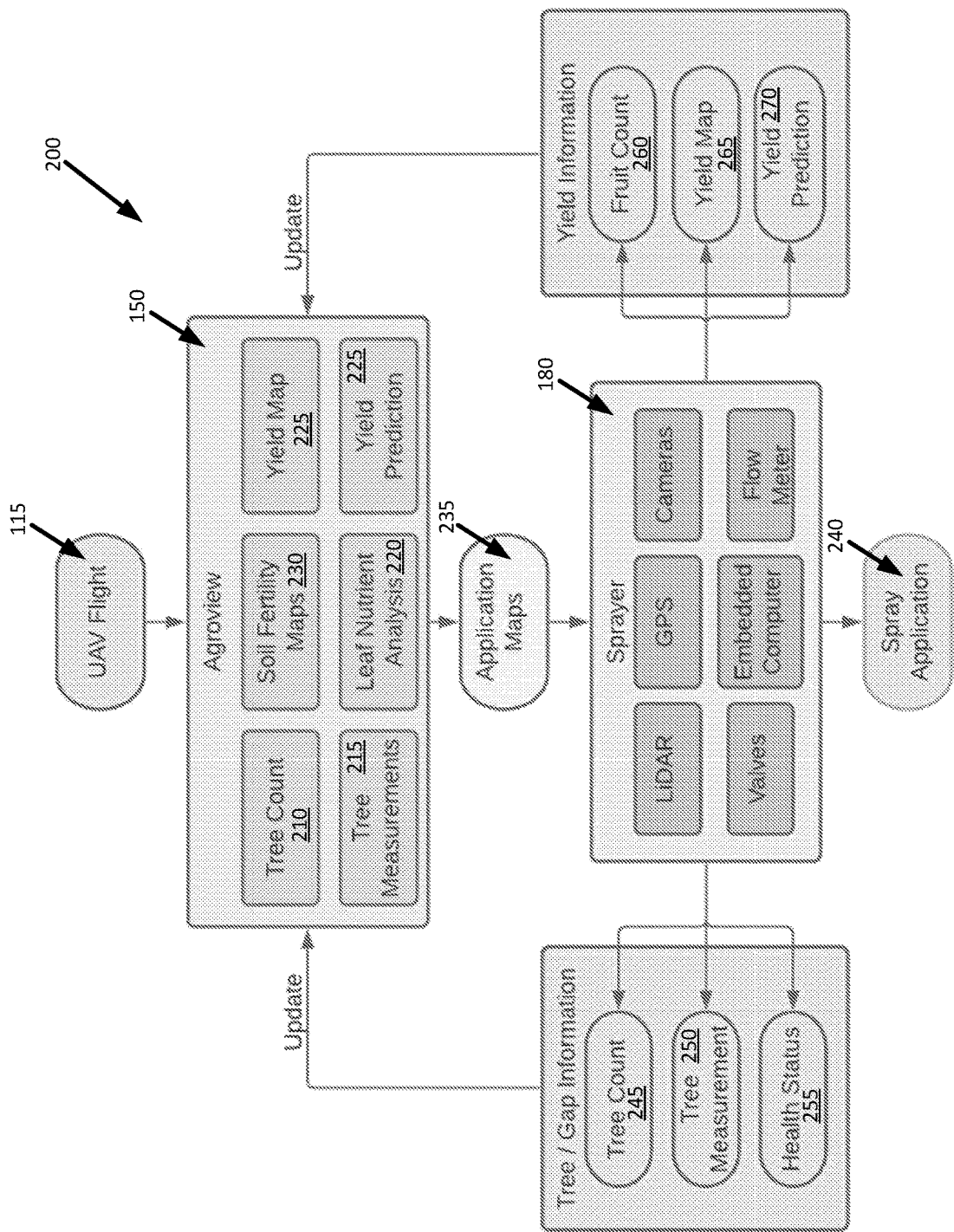
FIG. 2 is a workflow of data exchange between a cloud environment and a smart sprayer system in accordance with various embodiments of the present disclosure.

Turning now to FIG. 2, a workflow of data exchange 200 between the smart sprayer system 180 and the cloud environment 150 according to various embodiments is shown. As previously noted, the cloud environment 150 may receive imaging data 140 of an area of interest 130 from a sensing platform 115. As described further herein, the cloud environment 150 may then process the imaging data 140 in generating one or more image maps having information such as tree count 210, tree measurements 215 (e.g., tree ages, tree canopy sizes, tree heights, tree health values), tree canopy leaf nutrient content 220, yield prediction 225, and/or the like, as well as one or more soil fertility maps 230 may be generated from soil data processed by laboratory analysis. Accordingly, in particular embodiments, the cloud environment 150 may generate an application map 235 from the various image maps with detailed information of how much spraying should be applied by region that is provided to the smart sprayer system 180 as application data 185. The smart sprayer system 180 may then use the application map 235 in a spray application 240 to control the flow of liquid being applied to trees in the area of interest (e.g., the tree grove) 130.

In addition, the smart sprayer system 180 in various embodiments collects and processes data 190 that can be communicated to the cloud environment 150. For instance, such collected data 190 may include tree count 245, tree measurements 250, tree health status 255, fruit count and/or fruit size estimation 260, yield map 265, yield prediction 270, fruit quality estimation, flush detection, flower count and/or flower size, and/or the like. Accordingly, in some embodiments, the cloud environment 150 may use such collected data 190 in updating the information on the various maps and/or processing data 175 generated by the cloud environment 150, creating a robust and precise layer of information for growers.

Accordingly, hosting the services used in the processing and analyzing the imaging and/or collected data 140, 190 in a cloud environment 150 provides several technical advantages in various embodiments of the disclosure overusing such services under a conventional (local) configuration. One such advantage is the scalability and flexibility provided in the cloud environment 150 that allows for accommodating the uploading of variable-sized imaging and/or collected data 140, 190 and the processing and analyzing of such data 140, 190 to produce desired image maps and/or detected parameters of objects identified in the maps (e.g., processing data 175). Specifically, the cloud environment 150 allows for processing of the imaging and/or collected data 140, 190 and image maps to be distributed over different instances and/or machines, as well as processing capacity to be increased and/or decreased as needed. This allows for improved efficiency in conducting such services and this capability can be quite useful when processing a significant amount of data (e.g., images) using artificial intelligence. Likewise, a cloud environment 150 can also typically accommodate extending bandwidth when needed to aid in uploading imaging and/or collected data 140, 190, as well as accommodate allocating more storage memory when needed to store additional imaging and/or collected data 140, 190 and corresponding processing data 175.

A cloud environment 150 also often provides higher reliability over conventional configurations in supporting the availability of the services and the imaging, collected, and/or processing data 140, 175, 190. Such a benefit is typically realized due to the architecture employed by many cloud environments 150 that includes rapid scalability and redundancy of processing capacity and storage 165 to respond to any increased demand on resources or system failure within the cloud environment 150. This capability can also lead to increased data security and prevention loss in various embodiments in that the redundancy of data storage 165 found in many cloud environments 150 helps to facilitate disaster recovery of any lost imaging, collected, and/or processing data 140, 175, 190.

Further, a cloud environment 150 facilitates allowing multiple users and/or systems to upload and access imaging and/or collected data 140, 190 into a centralized location, as well as allowing multiple users and/or systems to analyze, download, use, view, and/or the like the imaging, collected, and/or processing data 140, 175, 190. Accordingly, the cloud environment 150 allows for the centralized control of the imaging, collected, and/or processing data 140, 175, 190 and the processing and viewing of such data 140, 175, 190. This capability can help facility better quality control over the imaging, collected, and/or processing data 140, 175, 190 stored in the cloud environment 150, as well as help facilitate increased collaboration between users and/or systems.

For example, a first grower may collect and upload imaging data 140 into the cloud environment 150 for a communal tree grove used for growing apples. The first grower may analyze the imaging data 140 to determine the number of apple trees found in the grove and the height and general health of each tree (generate processing data 175). Later, a second grower may collect and upload imaging data 140 for the same communal grove into the cloud environment 150. The second grower may then perform the same analysis on the imaging data 140 he has uploaded to determine the number of apple trees found in the grove and the height and general health of each tree at the later time (generate processing data 175). In addition, since the first grower's processing data 175 is available in the cloud environment 150, the second grower may also compare the processing data 175 generated from his uploaded imaging data 140 with the processing data 175 generated from the first grower's uploaded imaging data 140 to obtain a better understanding of the overall trending health and well-being of the apple trees found in the communal grove. Thus, utilizing the cloud environment 150 allows for the first and second growers to collaborate on their findings to better understand and manage the communal tree grove.

Figure 3:
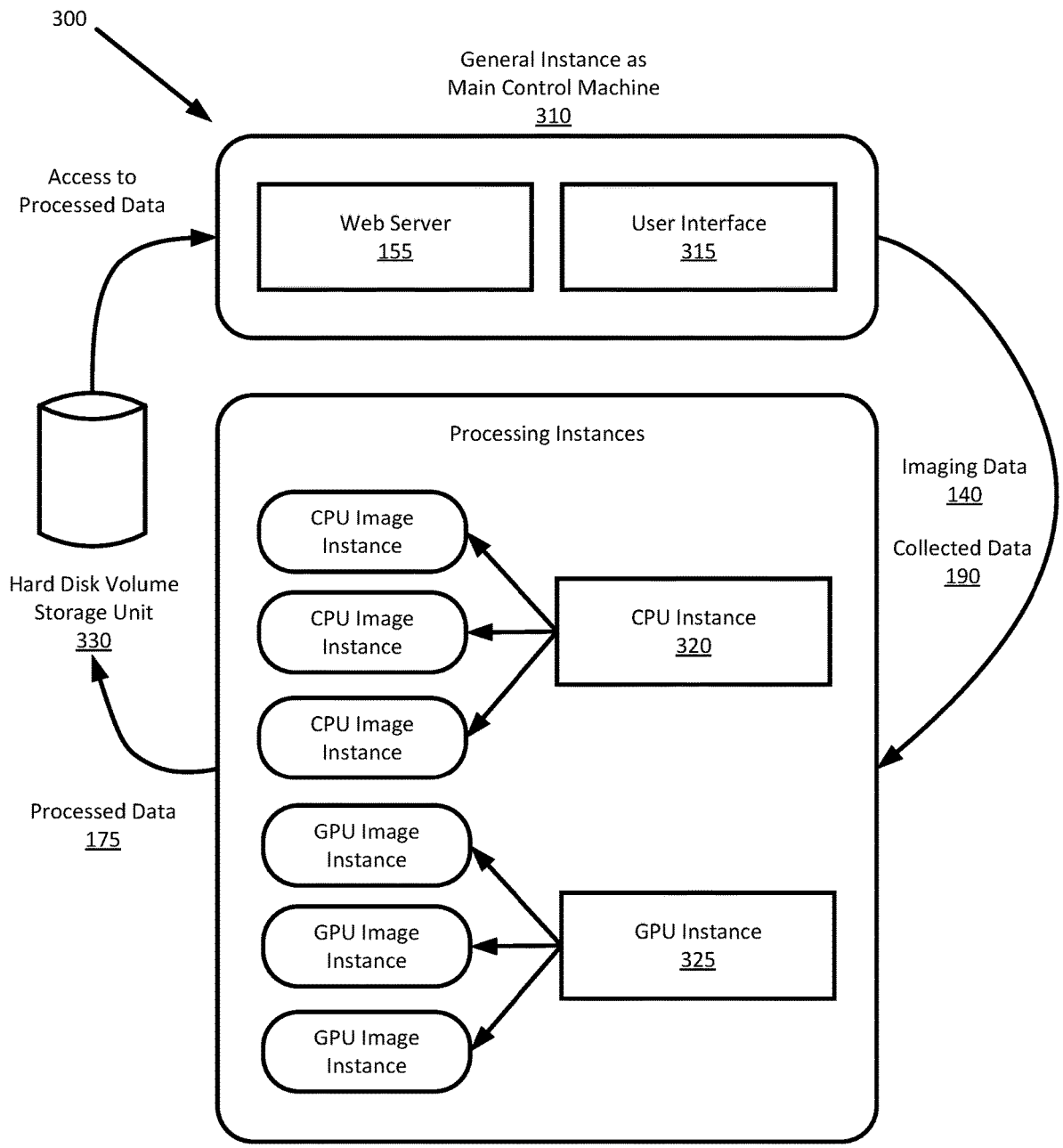
FIG. 3 is a workflow of a cloud environment employing various instances in accordance with various embodiments of the present disclosure.

Turning now to FIG. 3, an embodiment of a workflow 300 of a cloud environment 150 is shown employing the various processing instances discussed above. Here, imaging data 140 is uploaded to the cloud environment 150 by utilizing a user interface 315 provided via a general instance as the main application control machine 310 accessible, for example, through a web server 155 hosted within the cloud environment 150. In addition, collected data 190 may be uploaded to the cloud environment 150 from a system (e.g., via an application programming interface) such as, for example, a smart sprayer system 180. Upon receiving new imaging data 140 to process, the general instance 310 activates an instance of an image (CPU instance 320) in particular embodiments to perform the stitching of the imaging data 140 into one or more image maps (e.g., orthomosaic) and, in some instances, the generating of one or more Digital Surface Model (DSM) files. For example, in some embodiments, the CPU instance 320 may be a compute-optimized instance such as a c5.9×large instance. Once completed, the CPU instance 320 is then closed in some embodiments. The general instance 310 may then activate an instance of an image (GPU instance 325) in particular embodiments to execute the one or more object detection algorithms on the image maps and/or DSM files for detection purposes. For example, in some embodiments, the GPU instance 325 may be an accelerated computing instance, such as a p3.2×large instance. In addition, the GPU instance 325 may be used in processing the collected data 190 received from the system. Again, the GPU instance 325 may then be closed in some embodiments once execution is completed. Accordingly, for scalability and parallel processing, both instances work in various embodiments by activating further instances for the different processes being executed for the imaging and/or collected data 140, 190, so that multiple maps and/or processing data 175 can be generated at the same time. Once processing has been completed, the resulting maps and/or processing data 175 may be stored in a Hard Disk Volume storage unit 330 within the cloud environment 150 so that it may be accessed for viewing using the user interface 315 available through the webserver 155.

b. Exemplary Computing Entity

Figure 4:
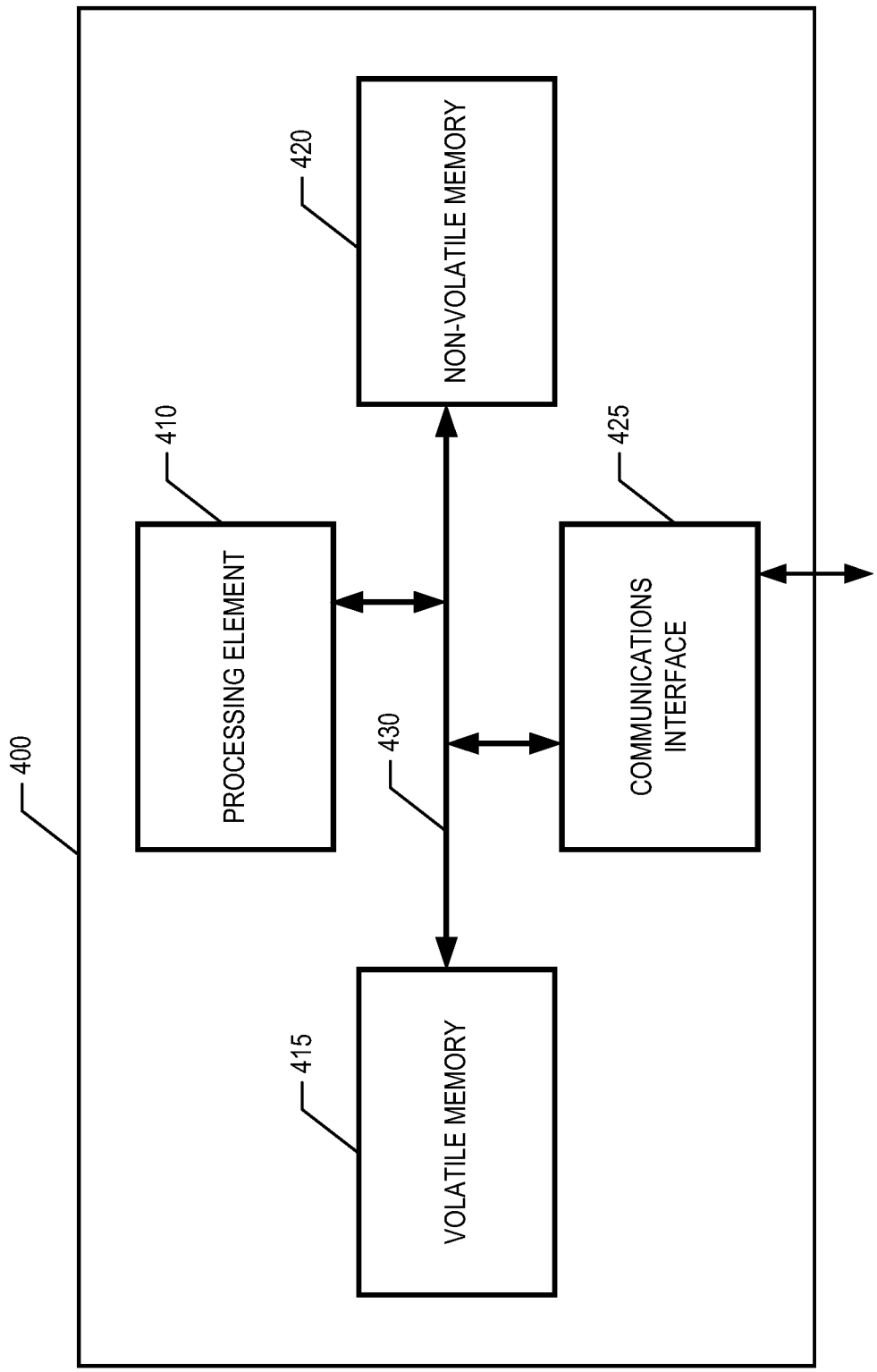
FIG. 4 is a schematic of a computing entity in accordance with various embodiments of the present disclosure.

FIG. 4 provides a schematic of a computing entity 400 according to various embodiments of the present disclosure. For instance, the computing entity 400 may be the webserver(s) 155 and/or application server(s) 160 found within the cloud environment 150 previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should understand that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 425 for communicating with various computing entities, such as by communicating data, content, information, and/or similar terms used herein interchangeably that can be transmitted, received, operated on, processed, displayed, stored, and/or the like. For instance, the computing entity 400 may communicate with other computing entities such as one or more user devices 125, 170, systems, and/or the like for uploading imaging and/or collected data 140, 190, downloading application data 185, and/or displaying processing data 175. Thus, in certain embodiments, the computing entity 400 may be configured to receive data from and/or transmit/send data to one or more data sources and/or user devices 125, 170, as well as receive data from and/or transmit/send data to a system such as smart sprayer system 180.

Depending on the embodiment, the networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber-coaxial (HFC) medium, terrestrial microwave transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 410 (also referred to as processors, processing circuitry, and/or similar terms used herein interchangeably) that communicate with other elements within the computing entity 400 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entire hardware embodiment or a combination of hardware and computer program products. Thus, the processing element 410 may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present disclosure when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein include cloud data storage in which some or all the information/data required for the operation of the object detection process on imaging data 140 and/or the resulting processing data 175 may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 410 and operating system.

As will be appreciated, one or more of the computing entity's components may be located remotely from other computing entity components, such as in a distributed system. Furthermore, one or more of the components may be aggregated and additional components performing functions described herein may be included in the computing entity 400. Thus, the computing entity 400 can be adapted to accommodate a variety of needs and circumstances.

II. Exemplary System Operation

The logical operations described herein may be implemented (1) as a sequence of computer-implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

a. Processing Imaging Data Module

Figure 5:
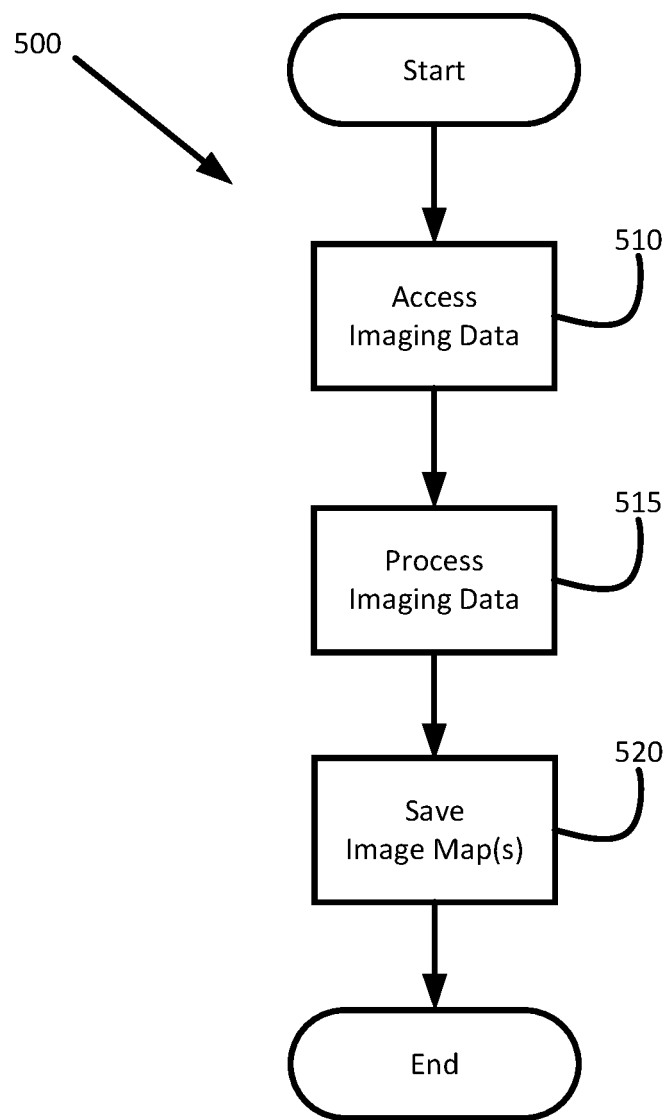
FIG. 5 is a process flow for processing imaging data in a cloud environment in accordance with various embodiments of the present disclosure.

Turning now to FIG. 5, additional details are provided regarding a process flow for processing imaging data 140 uploaded into a cloud environment 150 according to various embodiments. For purposes of simplicity, the description will focus on processing imaging data 140 taken for a precision agriculture application such as crop (e.g., fruit) production. However, those of ordinary skill in the art should understand the process may also be suitable for use in other types of applications in which object detection in images collected for areas of interest may be desired. Here, FIG. 5 is a flow diagram showing a processing imaging data module for performing such functionality according to various embodiments of the disclosure. For example, the flow diagram shown in FIG. 5 may correspond to operations carried out by a processing element 410 in a computing entity 400, such as an application server 160 hosted in the cloud environment 150 described in FIG. 1, as it executes the processing imaging data module stored in the computing device's volatile and/or nonvolatile memory.

The process flow 500 begins with the processing imaging data module accessing the imaging data 140 in Operation 510. Here, depending on the embodiment, the processing imaging data module may access the imaging data 140 from some type of storage 165 found within or external to the cloud environment 150. While in other instances, the processing imaging data module may receive the imaging data 140 directly as a result of a user uploading the data 140 to the cloud environment 150. In general, the imaging data 140 is composed of raw images acquired of an area of interest. For instance, a sensing platform 115 may be used to gather the imaging data 140 from an orchard by using one or more UAVs (or similar image capturing devices 120). Once gathered, a user may upload the raw images directly to the cloud environment 150 for processing to generate one or more image maps (e.g., one or more orthomosaic maps).

Accordingly, in various embodiments, the processing imaging data module processes the imaging data 140 to generate the image maps in Operation 515. For instance, in particular embodiments, the processing imaging data module may make use of a stitching engine to generate one or more image map(s) by stitching together the raw images found in the imaging data 140. For example, the processing imaging data module may make use of Pix4Dmapper, a stitching engine configured to stitch and geometrically correct the collected raw images into one or more orthomosaic maps that accurately represent the area of interest 130. While in other instances, the processing imaging data module uses the open-source toolkit OpenDroneMap (ODM). Here, ODM supports raw JPEG images as input and generates an orthorectified image along with a DSM file. Accordingly, in particular embodiments, the DSM file may contain the height information of the area of interest that was imaged.

For example, the stitching engine may be configured to stitch the raw images by generating a map for each band (blue, green, red, and near-infrared) and combining the band maps into one or more image maps such as an RGB map, an RNB map, and/or the like. As previously mentioned, the RNB map may use the near-infrared channel as the green channel representation. As a result, the RNB map in some embodiments may show a visually better contract between objects (e.g., trees) and surroundings and can give a better detection rate than an RGB map.

Once the processing imaging data module has produced one or more image maps from the imaging data 140, the module saves the image map(s) (and DSM file(s)) in Operation 520. Here, in particular embodiments, the processing imaging data module saves the image map(s) in some type of non-volatile data storage 165 found within the cloud environment 150 or accessible by the cloud environment 150. Such a configuration allows for the image map(s) to be available to multiple users through the cloud environment 150. In addition, the use of the cloud environment 150 allows for scalability and flexibility in adjusting the availability of storage 165 to accommodate the storing of the image map(s) and the raw imaging data 140.

At this point, the image map(s) (and DSM file(s)) are now available for analysis. Accordingly, as discussed further herein, various users may access the image map(s) through the cloud environment 150 to perform an analysis on the map(s) to identify objects found within the map(s), as well as parameters of the objects.

Finally, it is noted that in particular instances, a user may instead choose to process the raw imaging data 140 to generate one or more image maps (orthomosaic maps) before uploading to the cloud environment 150. Therefore, in these instances, the image maps may be directly saved to be accessible through the cloud environment 150 without first using the processing imaging data module to process the raw imaging data 140.

b. Processing Image Map Module

Figure 6:
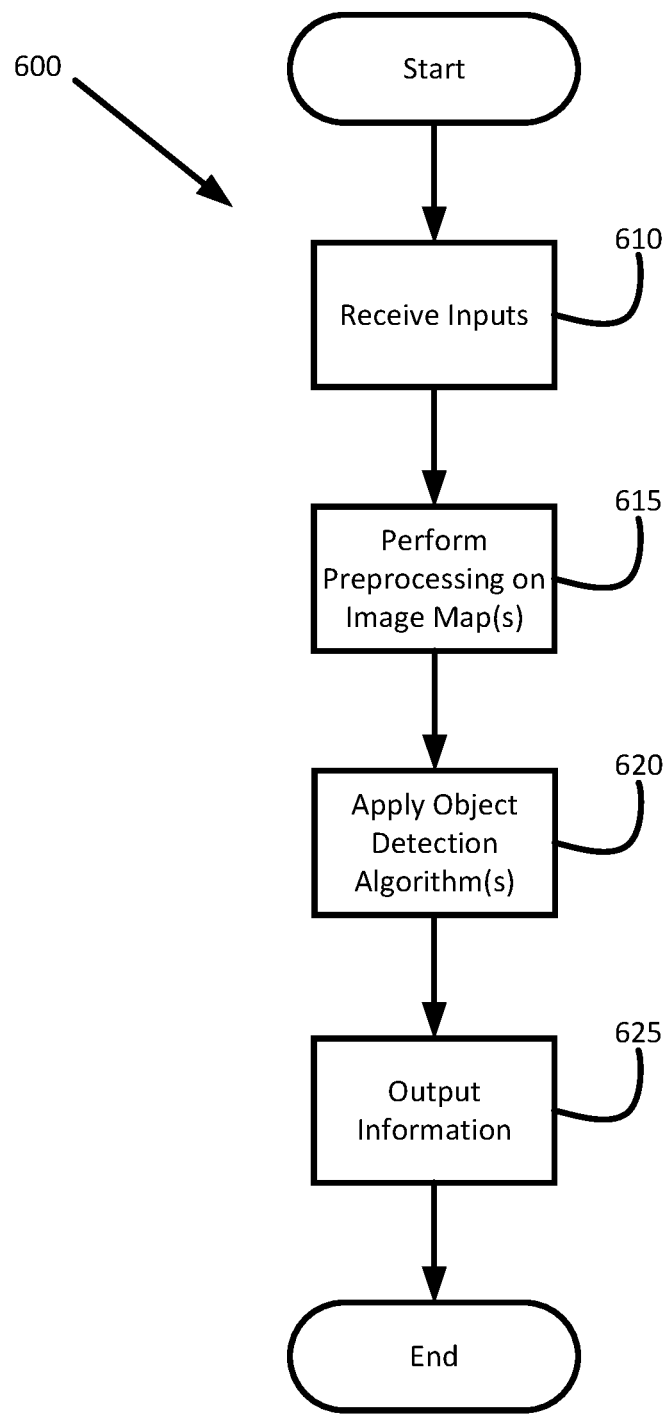
FIG. 6 is a process flow for processing and analyzing image maps in a cloud environment in accordance with various embodiments of the present disclosure.

Turning now to FIG. 6, additional details are provided regarding the process flow for processing and analyzing one or more image maps (and DSM file(s)) for object detection purposes in a cloud environment 150 according to various embodiments. Again, the description will focus on processing and analyzing image maps generated for a precision agriculture application such as crop production. In particular, FIG. 6 is a flow diagram showing a processing image map module for performing such functionality according to various embodiments of the disclosure. For example, the flow diagram shown in FIG. 6 may correspond to operations carried out by a processing element 410 in a computing entity 400, such as an application server 160 hosted in the cloud environment 150 described in FIG. 1, as it executes the processing image map module stored in the computing device's volatile and/or nonvolatile memory.

The process flow 600 begins with the processing image map module receiving inputs from a user in Operation 610. In particular embodiments, a user may access one or more image maps generated from raw imaging data 140 collected for an area of interest 130 through the cloud environment 150 by visiting a website made available by the cloud environment 150. Here, the user may be interested in analyzing the map(s) to identify one or more objects found in the maps and parameters related to the objects. For example, the image map(s) may be of an orchard grove in which the user is interested in identifying the number of apple trees found in a particular region of the grove and the height of each tree found in the region. Accordingly, the website provides the user with an interface 315 that allows the user to enter one or more inputs.

In various embodiments, the input(s) include a region to analyze (e.g., a region of interest) and, optionally, object spacing. For instance, returning to the example, the region to analyze may represent an area on the image map(s) where the user is interested in running the object (e.g., tree) detection algorithm(s) (a.k.a., field boundaries) to identify trees. While the object spacing may represent the space (e.g., average space) between trees in the same row in either meters or feet. Here, in particular embodiments, the user interface 315 may also provide the user with a tool that allows the user to select blank areas inside the region for the algorithm(s) to skip/ignore, such as lakes or buildings.

At this point, the processing image map module performs preprocessing on the image map(s) in Operation 615 for various embodiments. For instance, in particular embodiments, the processing image map module may perform color calibration based at least in part on the RGB average levels of the original image for normalization purposes to reduce variations that may result from using different cameras to capture the imaging data 140, as different cameras may have their own calibration of color, exposure, and saturation. Here, the preprocessing may help to increase the effectiveness of the object detection algorithm(s).

Once preprocessing is completed, the processing image map module runs one or more object detection algorithms on the image map(s) to identify the number of objects along with interested parameters for the objects in Operation 620. For instance, returning to the example involving the tree grove, the processing image map model may initially run a first object detection algorithm on the image map(s) to identify an initial number of trees (e.g., initial locations of trees) found in the region. Accordingly, the processing image map module may then analyze field row orientation patterns to estimate distances between trees and rows.

For example, in particular embodiments, the processing image map module is configured to recognize one or more tree patterns such as row orientation(s) by performing array operations to analyze and compare tree pattern(s) (e.g., row(s)) and to estimate distances between trees and/or distances between pattern(s) (e.g., tree spacing). After recognizing the tree row(s), the processing image map module may detect (e.g., predict) false-positive trees found in the region by recognizing detected trees that do not follow a tree row and/or is located between rows and may discard/remove such false-positive trees. At this point, in some embodiments, the processing image map module detects (e.g., predicts) tree gaps in the tree row(s) by analyzing the distance between detected trees in a tree row and comparing it with the average space/distance between trees (e.g., object spacing). Accordingly, the detected gaps may be either true positive gaps, meaning a tree is not present in the location, or a false positive gap, meaning a tree is present in the location and was not detected.

With each row's information, the processing image map module may then run a second object detection algorithm along each row for a more precise detection. Here, in particular embodiments, the first object detection algorithm may make assumptions of probable tree locations, and the processing image map module may use this information to run the second object detection algorithm based at least in part on the previously detected locations (positions).

As previously noted, in various embodiments, the object detection algorithm(s) may utilize artificial intelligence to improve detection accuracy. For instance, in particular embodiments, one or more object detection algorithms may be one or more machine learning models. For example, one or more object detection algorithms may be convolutional neural networks (CNN). Neural networks have been used in many instances involving object recognition in images over conventional approaches because conventional approaches typically make certain assumptions about the circumstances under which an image was taken that seldom hold in real-world environments. Most conventional approaches follow the paradigm of pattern recognition that consists of two steps in which the first step computes complex handcrafted features from a raw image, and the second step learns classifiers based at least in part on the obtained features. However, it is rarely known in real-world scenarios which features are important for the task at hand since the choice of feature is highly problem-dependent.

However, deep learning models, such as neural networks, are a class of machines that can learn a hierarchy of features by building high-level features from low-level ones, thereby automating the process of feature construction. An artificial neural network is a learning algorithm inspired by biological neural networks' structure and functional aspects. Computations are structured in terms of an interconnected group of artificial neurons, processing information using a connectionist approach to computation. Artificial neural networks are typically used to model complex relationships between inputs and outputs to find patterns in data or capture a statistical structure in an unknown joint probability distribution between observed variables.

Traditional CNNs are a type of deep learning model in which trainable filters and local neighborhood pooling operations are applied alternatingly on raw input images, resulting in a hierarchy of increasingly complex features. CNNs can achieve superior performance on visual object recognition tasks without relying on handcrafted features. Thus, these types of neural networks are used in various embodiments because they have proven very effective in visual object recognition and classification.

CNNs are generally made up of four main operations (layers), the first being convolution. The primary purpose of convolution is to extract features from an input image. Accordingly, convolution preserves the spatial relationship between pixels by learning image features using small squares of input data.

A filter (kernel or feature detector) is typically slid over an image by so many pixels at a time (stride) and for every position, an element-wise multiplication is computed. The multiplication outputs are then added to get a final value (e.g., integer) which forms a single element of the output matrix (activation or feature map). Different filters produce different feature maps for the same input image. That is to say, different filters detect different features from an image. In practice, a CNN learns the values of these filters on its own during the training process. Thus, the more the number of filters that are used, the more image features get extracted and the better the CNN becomes at recognizing patterns in unseen images.

The size of the feature map is controlled by three parameters that are set before convolution is carried out. The first parameter is depth, which corresponds to the number of filters used for the convolution operation. If three different filters are used, then the depth of the feature map is three (the three feature maps are stacked 2D matrices). The second parameter is stride that identifies the number of pixels by which the filter matrix is slid over the input matrix. A stride of one means the filter is moved one pixel at a time. The larger the stride, the smaller the produced feature maps. The third and final parameter is zero-padding that identifies whether the input image matrix is padded with zeros around the border. Zero-padding is added so that the filter can be applied to the bordering elements of the input image matrix. Consequently, zero padding allows one to control the size of the feature maps.

The size of a feature map produced from a convolution can be determined as ((input volume size—size of the filter +2*padding applied)/number of strides) +1. Therefore, if the input image is 32×32×3 and ten filters are going to be applied, using a single stride and no padding, then the size of the feature map =((32−3+2*0)/1) +1=30. Thus, making the feature map equal to 30, 30, 10.

The second operation in a CNN is typically a rectified linear unit (ReLU) layer that can be used after every convolution operation. This operation replaces all of the negative pixel values in the feature map by zero. The purpose of ReLU is to introduce non-linearity in the CNN, since most real-world data one would want the CNN to learn is non-linear. Because convolution is a linear operation, non-linearity can be accounted for by introducing a non-linear function like ReLU. The output feature map from this operation can be referred to as the rectified feature map.

A third operation in a CNN is typically spatial pooling (subsampling or downsampling). Spatial pooling reduces the dimensionality of each feature map but retains the most important information. That is to say, the function of pooling is to reduce the spatial size of the input representation progressively. Depending on the embodiment, different pooling types may be applied, such as maximum, average, and sum. For example, in max-pooling, a spatial neighborhood (e.g., 2×2 window) is defined, and the largest element from the rectified feature map within the window is taken. The window is slid over the rectified feature map, and the maximum value is taken for each slide (each region). Accordingly, in other examples, the average or sum of all the window elements could be taken instead.

As a result of pooling, the input representations are made smaller and more manageable. The number of parameters and computations are reduced in the CNN, therefore, controlling overfitting. The CNN is made invariant to small transformations, distortions, and translations in the input image. That is to say, a minor distortion in the input will not change the output of pooling since the maximum/average value is taken in a local neighborhood. Finally, pooling helps to arrive at an almost scale-invariant representation of the image (the exact term is "equivariant"). This is very powerful since objects can be detected in an image no matter where they are located. Note that it is unnecessary to have a pooling layer after every convolutional layer in a CNN architecture.

The fourth and final operation in a CNN is typically classification. The classification operation represents a fully-connected layer that is a traditional multi-layer perception that uses an activation function such as softmax, for example, in the output layer (although other classifiers such as SVM can be used). Here, the term "fully-connected" implies that every neuron in the previous layer is connected to every neuron on the next layer. Accordingly, the output from the convolutional and pooling layers represents high-level features of the input image. The purpose of the fully connected layer is to use these features for classifying the input image into various classes based at least in part on a training dataset. The sum of output probabilities from the fully connected layer is one when using the softmax as the activation function in the output layer. The softmax function takes a vector of arbitrary real-valued scores and squashes it to a vector of values between zero and one that sums to one. Thus, the convolution and pooling layers act as feature extractors from the input image, and the fully-connected layer acts as a classifier.

To train a traditional CNN using a training dataset, all filters and parameter weights are typically initialized with random values. A training image is then provided as input to the CNN, and the network goes through the forward propagation step and finds the output probabilities for each class. The total error at the output layer is calculated (e.g., total error=summation of 0.5*(target probability—output probability)/\^2), and backpropagation is used to calculate the gradients of the error with respect to all weights in the CNN. Gradient descent can then be used to update all filter and parameter weights to minimize the output error. Weights are adjusted in proportion to their contribution to the total error. Normally, parameters such as number of filters, filter sizes, the architecture of the network, etc., are fixed before training the CNN and do not change during the training process. Only the values of the filter matrix and connection weights are updated.

Since multiple objects (e.g., trees) are required to be identified in many instances within a region of an image map, machine learning models such as region-based CNNs (R-CNNs) are used in various embodiments as a first object recognition algorithm applied to the region. For example, in some embodiments, the first object recognition algorithm may be configured as an R-CNN based at least in part on the ResNet101 framework. R-CNNs first select several proposed areas from an image and then label their categories and bounding boxes. Here, a bounding box is developed for each object in the region of the image. Then, a CNN is used to perform forward computation to extract features from each proposed area. Afterward, the features of each proposed area are used to predict their categories and bounding boxes.

In general, R-CNNs may be composed of four parts. The first part involves performing a selective search on the region of the image map to select multiple proposed areas. These proposed areas are generally selected on multiple scales and have different shapes and sizes. The category and ground-truth bounding box of each proposed area is labeled. The second part involves placing a pre-trained CNN, in truncated form, before the output layer. This transforms each proposed area into the input dimensions required by the network and uses forward computation to output the features extracted from the proposed area. The third part involves combining the features and labeled category of each proposed area as an example to train multiple classifiers such as, for example, support vector machines for object classification. Here, each support vector machine is used to determine whether an example belongs to a specific category. Finally, the fourth part is combining the features and labeled bounding box for each proposed area as an example to train a linear regression model for ground-truth bounding box prediction.

Although R-CNN models can effectively use pre-trained CNNs to effectively extract image features for each bounding box effectively, a drawback often encountered is slow speed. This is typically the result of selecting a large number of proposed areas from a single image, requiring thousands of forwarding computations from the CNN, resulting in a massive computing load to perform object detection. However, because the system architecture employed in various embodiments of the disclosure involves the use of a cloud environment 150, such a configuration allows for the computation to be performed in a dynamic setting that can adjust as needed to accommodate for needed additional resources. Therefore, performing the functionality (operations) of the processing image map module in a cloud environment 150 in various embodiments of the disclosure help to facilitate the use of R-CNNs and results in better accuracy in objection detection in many instances.

Finally, a Faster R-CNN may be utilized in particular embodiments to further address the main performance bottleneck of an R-CNN model of independently extracting features for each proposed area. As these areas may have a high degree of overlap, independent feature extraction can result in a high volume of repetitive computations. Therefore, Faster R-CNN can improve on the R-CNN by only performing CNN forward computation on the desired region of the image map as a whole. Compared to an R-CNN model, a Faster R-CNN model uses the entire image as the CNN input for feature extraction, rather than each proposed area.

As for the second object recognition algorithm, various embodiments make use of a deep learning model such as you only look once (YOLO) CNN. For example, in particular embodiments, the second object recognition algorithm may be a CNN such as a Darknet19 network trained using the YOLOv4 framework. Here, the model applies a single neural network to the entire region of the image map and then divides the map into sections and predicts bounding boxes and probabilities for each section. The predicted probabilities weigh these bounding boxes. Thus, the model "only looks once" at the region of the image map in the sense that it requires only one forward propagation pass through the neural network to make predictions. After non-max suppression (which makes sure the object detection algorithm only detects each object once), it then outputs recognized objects together with the bounding boxes.

Finally, the processing image map module may generate different processing data 175 as output in Operation 625 depending on the embodiment. For instance, returning to the precision agriculture example, along with the tree detection, the processing image map module may output individual tree gaps on the one or more image map(s), individual tree area and/or height, tree canopy area estimations, and/or the like for individual trees. The processing image map module may further generate and output tree age estimations, tree health estimations, tree nutrient concentration estimations, and/or the like.

For instance, in particular embodiments, the processing image map module may generate canopy area/size for a detected tree based at least in part on a normalized difference vegetation index (NDVI). Here, an average NDVI may be calculated for a selected region, and the processing image map module may compare the NDVI for individual pixels to the average to classify the pixels into "soil" or "tree canopy." In some instances, an empirical threshold may be applied in classifying a pixel as either "soil" or "tree canopy." For example, the processing image map module may be configured to classify a pixel as "tree canopy" if the pixel's NDVI value is greater than the NDVI average value multiplied by the empirical threshold (e.g., 0.85).

As another example, in particular embodiments, the processing image map module may generate a tree height, or a tree height estimation, for a detected tree. The processing image map module may perform filter algorithms on image map(s) (and/or DSM file(s)) to generate tree height values for various detected trees. In various embodiments, an image map is a binary (black/white) image of the area of interest, and the "whiteness" or value of each pixel of the binary image corresponds to a height or elevation of a point or an area corresponding to the pixel. Pixels classified as "soil," or otherwise pixels that are not identified as being a tree, are filtered to determine a surface curve of the ground, due to the understanding that the ground may not be perfectly level (e.g., uniformly elevated). Likewise, pixels classified as "tree canopy" may have a distribution of values corresponding to a distribution of heights or elevations. Then, in various embodiments, a tree height value for a detected tree may be generated based at least in part on values of pixels classified as "tree canopy" and values of pixels classified as "soil." Specifically, a tree height value may be generated based at least in part on a difference between the top 20% of "tree canopy" pixel values and "soil" pixel values in an area near the tree (e.g., determined via the surface curve of the ground).

The processing image map module may also generate a tree health value for a detected tree. NDVI may be used again here to identify important "tree canopy" pixels. For example, NDVI may be used to identify "tree canopy" pixels with higher values, and filtering out "tree canopy" pixels with lower values (e.g., pixels of leaves in shadows or dark leaves). The processing image map module may then use a recognition algorithm on the identified high-value "tree canopy" pixels to generate a tree health value or score. In various embodiments, detected trees are classified into health categories based at least in part on the tree health value or score.

Figure 7:
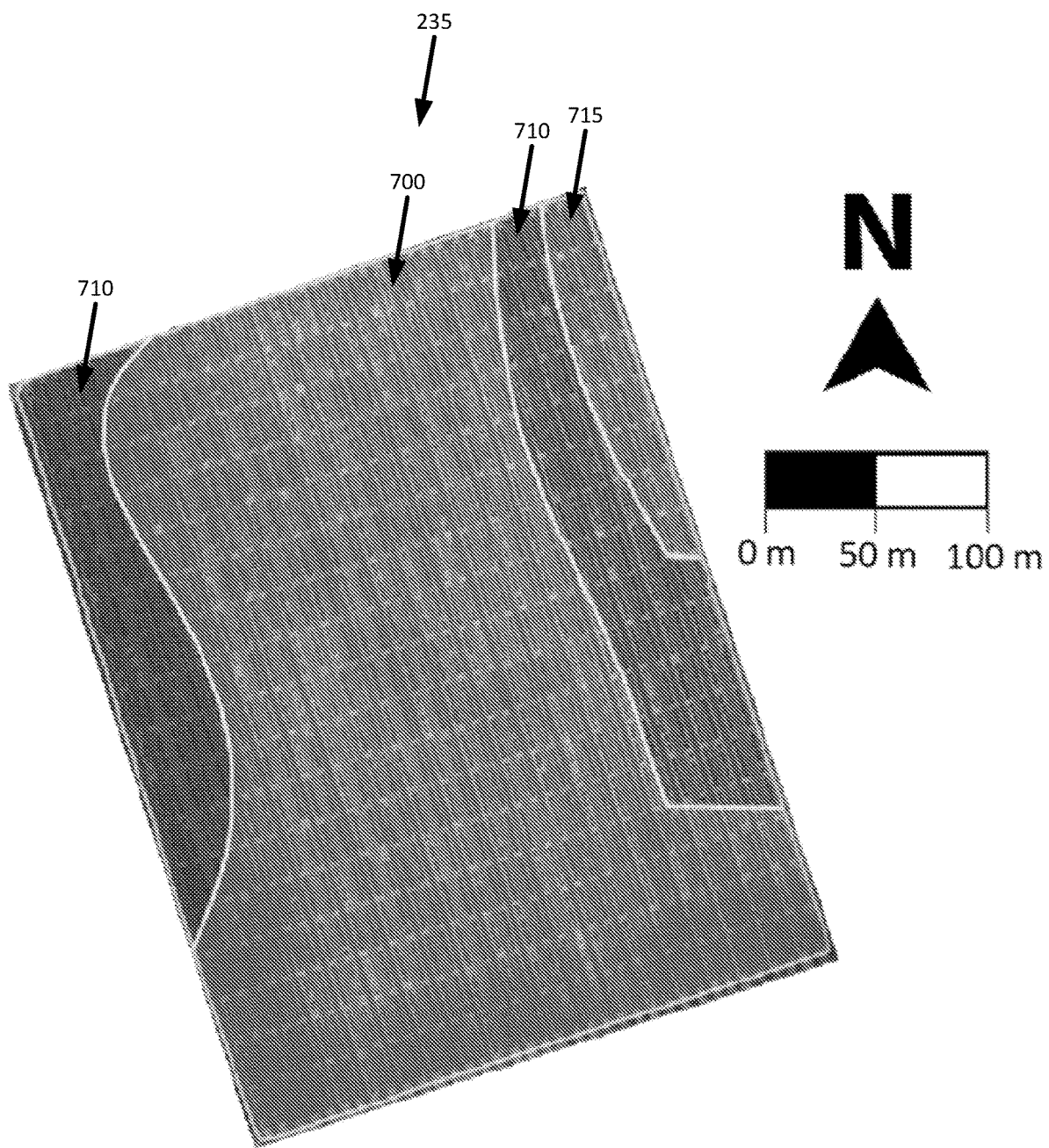
FIG. 7 is an example of an application map that can be used in accordance with various embodiments of the present disclosure.

In addition, in particular embodiments, the processing image map module may generate application data 185 (e.g., an application map 235) for a system such as the smart sprayer system 180 previously described. Here, for example, the application map 235 may include detailed information of how much spraying the smart sprayer system 180 should apply to the region, as well as other regions that have been analyzed for the area of interest. An example of an application map 235 is shown in FIG. 7. Each region 700, 710, 715 of the application map 235 corresponds to a different application rate to be used by the sprayer. Accordingly, the smart sprayer system 180 may then use the application map 235 in a spray application 240 to control flow of liquid being applied to trees in the area of interest (e.g., the tree grove) 130.

In various embodiments, an application map 235 is generated based at least in part on various data, values, and scores generated for detected trees. For example, an application map 235 is generated based at least in part on tree height values, tree health values or scores, and/or the like. In an embodiment where a spray application 240 controls the flow of pesticide being applied to trees in the area of interest 130, the processing image map module may generate an application map 235 based at least in part on tree health values or scores, such that regions where trees are unhealth and have low tree health values may be identified for increased application of pesticide, for example. In another embodiment where a spray application 240 controls the flow of fertilizer, the processing image map module may generate an application map 235 based at least in part on nutrient analysis of each tree. For example, nutrient analysis identifies the nutrient levels of a tree, which may be compared with nutrient requirements of the tree. Nutrient levels may also be compared with nutrient levels of other trees in the area of interest 130. An application map 235 may then be generated based at least in part on nutrient analysis and nutrient requirements of trees in the area of interest 130. For example, a tree with lower than average levels of potassium or a tree with low levels of potassium relative to potassium requirements may be identified in the application map 235 for a higher application rate of fertilizer. In various embodiments, the application map 235 is based at least in part on a fertility map generated from tree nutrient concentrations or tree nutrient concentration estimations.

Further, in particular embodiments, the processing image map module may generate processing data 175 based at least in part on collected data 190 received from a system such as, for example, the smart sprayer system 180. For instance, collected data 190 received from the smart sprayer system 180 may include yield estimation information on various trees for fruit, flowers, and/or the like. In addition, the collected data 190 may include other types of information on trees, such as a health status, health value, health score, age, nutrient concentration, and/or the like for a tree, as well as a health classification for the tree. For example, the collected data 190 includes a fertility map based at least in part on tree nutrient concentrations. Here, in particular embodiments, the processing image map module may generate processing data 175 by using the image map(s) and/or data generated using the image map(s) in complementing the collected data 190 such as yield estimation(s), tree health status, tree health classification, and/or the like, as well as generate additional processing data 175 such as one or more yields maps for the region and/or area of interest. In various embodiments, the collected data 190 is geotagged and/or is associated with location information and time information. For example, the collected data 190 comprises data points including LiDAR data, RGB camera data, speed data, flow meter data, model data, and/or the like, each with a geotag with a location and a time. Thus, processing data 175 may be generated based at least in part on the collected data 190 as well as location information and time information referenced and corresponding to the collected data 190.

Figure 8:
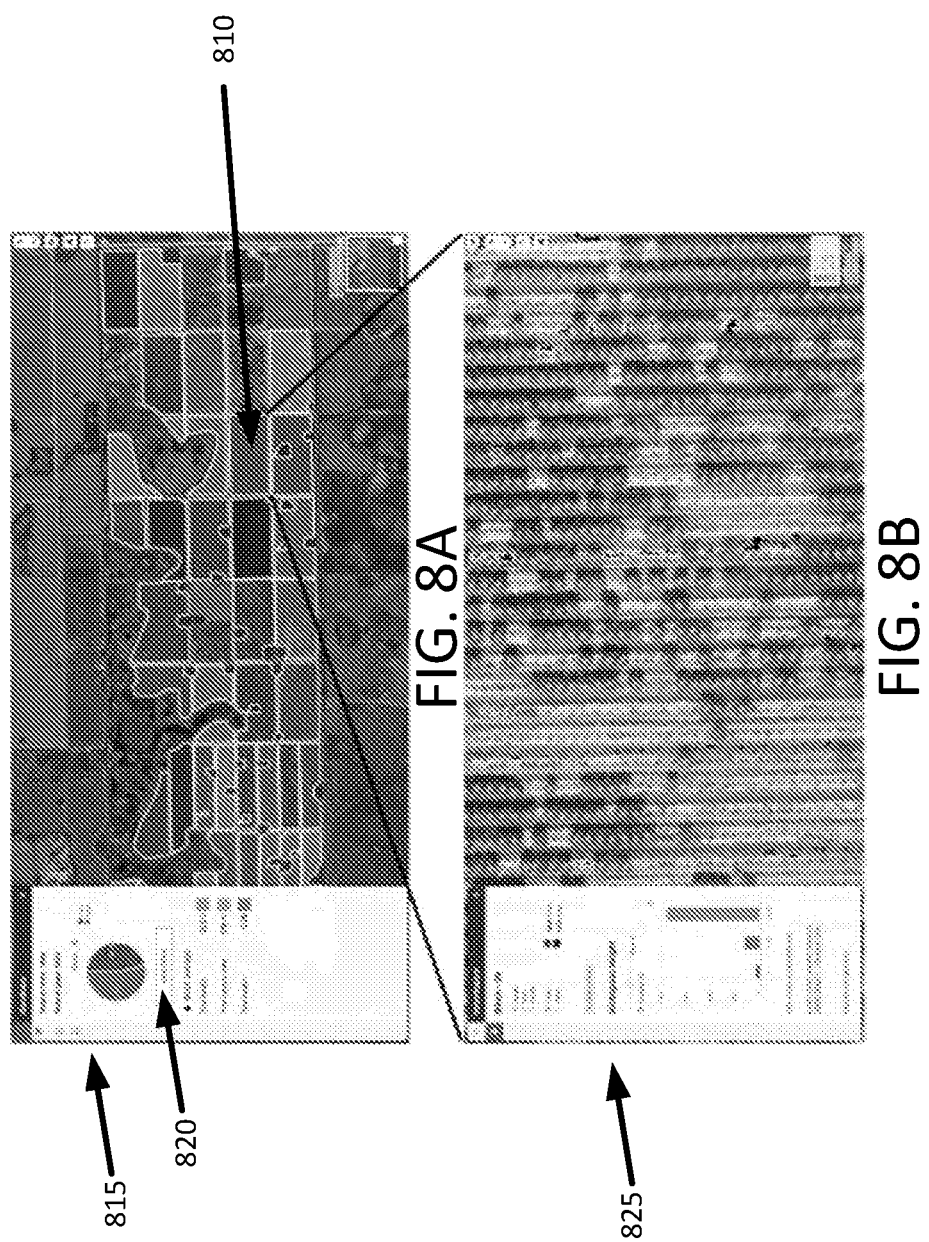
FIGS. 8A and 8B are user interfaces provided through a cloud environment in accordance with various embodiments of the present disclosure.

At this point, the user visiting the website hosted by the cloud environment 150 can review the processing data 175. For example, in particular embodiments, the user may be able to view the final processed map on an interface 315 provided through the cloud environment 150. Turning now to FIGS. 8A and 8B, an interface 315 according to various embodiments are displayed. Here, the interface 315 may be configured to allow the user to select ("click on") a field (e.g., a citrus orchard) 810 and a window with various field analytics (e.g., a total number of tree, tree gap counts, field size, average values of tree height, canopy area, yield estimation, and/or the like) for the selected field is displayed 815. Additional information about the selected field (e.g., a new map with tree and tree gap detections) may be provided upon the user clicking a "View Block" button 820. Furthermore, the interface 315 may be configured to allow the user to select to display multiple categories based at least in part on parameters such as, for example, tree height, canopy size, and tree health 825. Moreover, the interface 315 may be configured to allow the user to select to display on the map only objects that belong to a specific category. For example, all trees less than seven feet in height. Here, the user may accomplish this by unselecting the other categories in the provided histogram. The total number of trees that belong to a specific category can be found by then selecting a category on the provided histogram.

It is noted that the processing image map module may be configured in particular embodiments to process and analyze one or more image maps (and DSM file(s)) for object detection purposes without being invoked based at least in part on user input. For instance, in some embodiments, the processing image map module may be invoked by another module such as the processing imaging data module. Here, for example, the processing imaging data module may invoke the processing image map module upon generating one or more image maps for imaging data 140 uploaded into the cloud environment 150. Accordingly, any input that may be needed by the processing image map module may be provided by the processing imaging data module or may retrieved from data storage 165. Such a configuration may result in providing information on the detected objects and/or processing data 175 more quickly through the interface 315 since the processing image map module is not required to process and analyze the one or more image maps at the time when a user may be interested in viewing data for a region of the one or more image maps.

Furthermore, one or more of the operations performed by the processing image map module may be carried out by another module in particular embodiments. For instance, in some embodiments, another module may be used in generating one or more of the parameters found in the processing data 175. Here, for example, the processing image map module may be configured to perform the object detection on the one or more image maps, while another module may be configured to perform the operation for generating the processing data 175 for parameters such as tree height, canopy estimation, health, health, and/or the like on detected object (e.g., trees).

c. Workflow for Processing and Analyzing Imaging Data in a Cloud Environment

Figure 9:
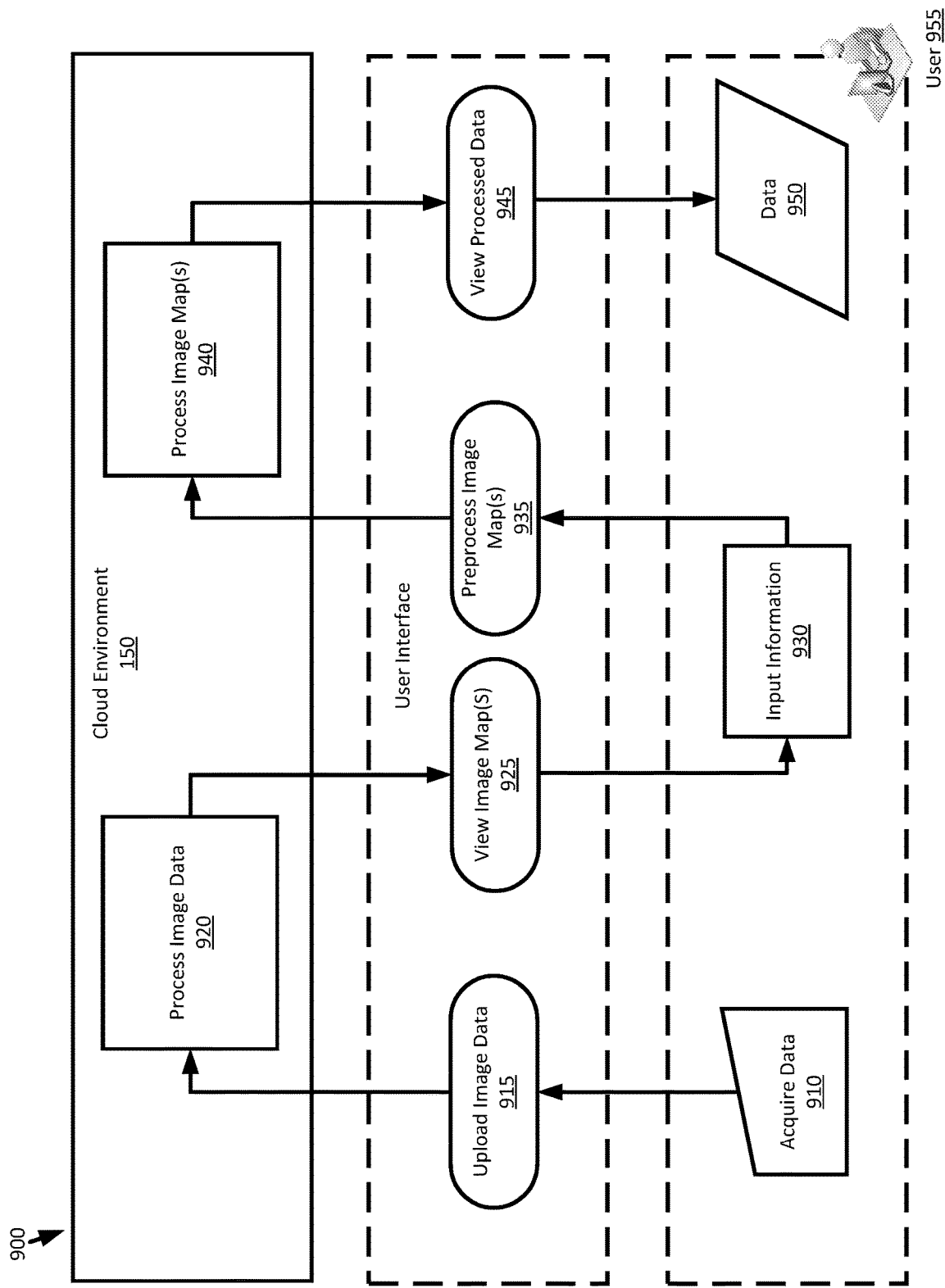
FIG. 9 is a workflow for processing and analyzing imaging data in a cloud environment in accordance with various embodiments of the present disclosure.

Turning now to FIG. 9, additional details are provided regarding a workflow 900 for processing and analyzing imaging data 140 in a cloud environment 150 for object detection purposes according to various embodiments. Here, the workflow 900 demonstrates the components used in processing and analyzing the imaging data 140 that are hosted in the cloud environment 150 to allow for improved performance and realization of advantages from using such an environment 150.

Specifically, the workflow 900 begins with acquiring the imaging data 140 in Step 910 by using some type of sensing platform 115. This particular step of the workflow 900 is performed outside of the cloud environment 150 and involves collecting raw imaging data 140 that is then typically uploaded in Step 915 to the cloud environment 150 over an interface such as a website hosted by the cloud environment 150. In addition, other sources may provide collected data 190 to the cloud environment 150 such as, for example, a smart sprayer system 180.

Here, the uploaded imaging data 140 generally contains several collected images amounting to a significant volume of data. Accordingly, the workflow 900 continues with processing the imaging data 140 in Step 920, For instance, in particular embodiments, a service hosted within the cloud environment 150 may use a stitching engine to stitch the collected images found in the imaging data 140 into one or more image maps (e.g., orthomosaic maps). In particular embodiments, this particular step of the workflow 900 may be performed by the service employing an instance for CPU intensive usage. Accordingly, hosting the service in the cloud environment 150 allows for various embodiments of the disclosure to scale the processing of the imaging data 140 with respect to processing capacity, bandwidth, and/or speed appropriately based at least in part on the volume of data making up the collected images. In addition, the cloud environment 150 allows for the scaling of storage 165 to accommodate the storing of the imaging data 140 and generated image maps.

At this point, a user may visit the website hosted by the cloud environment 150 and view the image maps in Step 925. Here, the user may decide to perform an analysis on a particular region of interest found on one or more of the image maps. Accordingly, in various embodiments, the user may provide information in Step 930 to identify the region of interest and other corresponding information. For instance, as previously described, the user may identify a particular grove area displayed on one or more image maps and tree spacing for the trees found in the grove. Here, the user may be interested in analyzing the grove area to determine information such as, for example, count and geo-locations of trees and tree gaps (locations of dead or no trees), tree height, canopy size, and/or individual tree health and status of the trees identified in the region of interest.

Accordingly, the workflow 900 continues in various embodiments with performing one or more preprocessing operations on the image map(s) for normalization purposes in Step 935. This particular step is performed in the workflow 900 for these particular embodiments to help improve the accuracy of the analysis performed on the region of interest. At this point, the analysis of the preprocessed image map(s) is performed in Step 940. Here, the analysis typically involves a service hosted by the cloud environment 150 performing some type of object (e.g., tree) detection on the identified region of interest to determine desired information. As previously discussed, object detection may involve using one or more object detection algorithms to detect particular objects within the region of interest along with certain parameters for the objects.

Again, this particular step of the workflow 000 is performed in the cloud environment 150 in various embodiments to realize several advantages afforded by such an environment 150. For instance, in particular embodiments, the service performing the object detection makes use of an instance for GPU intensive usage. Here, the cloud environment 150 allows for scalability and flexibility in allocating processing capacity, bandwidth, and/or speed for the GPU instance used in performing the object detection. In other words, the cloud environment 150 allows for improved performance in analyzing the image maps in various embodiments that would not otherwise be realized in a conventional (local) processing environment.

Once the object detection has been completed on the region of interest, the workflow 900 in various embodiments may continue by storing the processing data 175 resulting from the analysis in the cloud environment 150. Again, using the cloud environment 150 to store the processing data 175 allows particular embodiments of the disclosure to realize several advantages afforded by such an environment 150 in that the cloud environment 150 allows for scalability and. flexibility in storage capacity. In addition, the use of the cloud environment 150 for storing the processing data 175 allows for centralized control of this data 175, resulting in better quality control and increased access of the data 175 for various users. For instance, a number of different users 955 may access and view the data 950 in Step 945 through the website hosted by the cloud environment 150 using a number of different devices. Thus, an advantage of using the cloud environment 150 in various embodiments is users 955 can access and view the processing data 175 generated from the analysis of the imaging data 140 on a number of different, independent devices.

IV. Conclusion

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for detecting a plurality of objects located in an area of interest, the method comprising:
   receiving, via an interface provided through a general instance on a cloud environment, imaging data comprising a plurality of raw images collected on the area of interest;
   upon receiving the plurality of raw images:
      activating, via the general instance, a central processing unit (CPU)-focused instance on the cloud environment based at least in part on a CPU-focused machine configuration image;
      upon activating the CPU-focused instance, processing, via the CPU-focused instance, the plurality of raw images to stitch together each of the raw images of the plurality of raw images to generate an image map of the area of interest; and
      upon completion of generating the image map, closing, via the general instance, the CPU-focused instance on the cloud environment; and
   after generating the image map:
      activating, via the general instance, a graphical processing unit (GPU)-focused instance on the cloud environment based at least in part on a GPU-focused machine configuration image;
      upon activating the GPU-focused instance, performing object detection, via the GPU-focused instance, on at least a region within the image map by applying one or more object detection algorithms to the region of the image map to identify locations of the plurality of objects in the region of the image map; and
      upon completion of detecting the plurality of objects for the region, closing, via the general instance, the GPU-focused instance on the cloud environment; and
   performing one or more cloud-based actions based at least in part on the plurality of objects detected for the region within the image map.

2. The method of claim 1, wherein performing the object detection on the region within the image map comprises:
   preprocessing the image map to reduce variation in the image map resulting from capturing the plurality of raw images;
   applying a first object detection algorithm of the one or more object detection algorithms to identify initial locations of the plurality of objects in the region of the image map;
   identifying one or more object patterns in the image map;

analyzing the one or more object patterns to identify one or more false positives in the initial locations of the plurality of objects;

removing the one or more false positives from the initial locations of the plurality of objects; and after removing the one or more false positives from the initial locations of the plurality of objects, applying a second object detection algorithm of the one or more object detection algorithms to each of the one or more object patterns to identify the locations of the plurality of objects.

3. The method of claim 2, wherein the area of interest comprises a tree grove, the plurality of objects comprises a plurality of trees, and the one or more object patterns comprise one or more rows of trees.

4. The method of claim 1 further comprising receiving input, via the interface, originating from a user, wherein the input comprises at least one of the region within the image map, an object spacing identifying an average space between objects located in the region, or one or more blank areas found in the region to be skipped by the one or more object detection algorithms.

5. The method of claim 1, wherein the area of interest comprises a tree grove, the plurality of objects comprise a plurality of trees, and the one or more cloud-based actions comprise:

generating processing data for the plurality of trees, the processing data comprising at least one of a total number of trees for the plurality of trees, one or more tree gap counts, an average value of tree heights, a tree height for one or more of the plurality of trees, a canopy area estimation for one or more of the plurality of trees, a yield estimation of fruit for one or more of the plurality of trees, an estimation of tree ages for one or more of the plurality of trees, an estimation of tree health for one or more of the plurality of trees, estimated nutrient concentrations for one or more of the plurality of trees, or a fertility map based at least in part on estimated nutrient concentrations for the plurality of trees; and providing at least a portion of the processing data for display via the interface on a user device.

6. The method of claim 5, wherein the one or more cloud-based actions comprise:

receiving an input indicating a selection of the region from a user via the user device; and responsive to receiving the input indicating the selection of the region, providing a map of the region for display via the interface on the user device, the map displaying the plurality of trees detected for the region.

7. The method of claim 1, wherein the area of interest comprises a tree grove, the plurality of objects comprise a plurality of trees, and the one or more cloud-based actions comprise:

generating an application map identifying an application rate for at least the region within the image map; and downloading the application map to a smart sprayer system configured to use the application map to control flow of a liquid being applied to the plurality of trees in the region.

8. An apparatus operating within a general instance of a cloud environment for detecting a plurality of objects located in an area of interest, the apparatus comprising at least one processor and at least one memory including program code, the at least one memory and the program code configured to, with the at least one processor, cause the apparatus to at least:

receive, via an interface, imaging data comprising a plurality of raw images collected on the area of interest;

upon receiving the plurality of raw images:

activate a central processing unit (CPU)-focused instance on the cloud environment based at least in part on a CPU-focused machine configuration image, wherein upon activating the CPU-focused instance, the CPU-focused instance processes the plurality of raw images to stitch together each of the raw images of the plurality of raw images to generate an image map of the area of interest; and upon completion of generating the image map, close the CPU-focused instance on the cloud environment; and after the image map is generated:

activate a graphical processing unit (GPU)-focused instance on the cloud environment based at least in part on a GPU-focused machine configuration image, wherein upon activating the GPU-focused instance, the GPU-focused instance performs object detection on at least a region within the image map by applying one or more object detection algorithms to the region of the image map to identify locations of the plurality of objects in the region of the image map; and upon completion of detecting the plurality of objects for the region, close the GPU-focused instance on the cloud environment; and perform one or more cloud-based actions based at least in part on the plurality of objects detected for the region within the image map.

9. The apparatus of claim 8, wherein the GPU-focused instance performs the object detection on the region within the image map by:

preprocessing the image map to reduce variation in the image map resulting from capturing the plurality of raw images;

applying a first object detection algorithm of the one or more object detection algorithms to identify initial locations of the plurality of objects in the region of the image map;

identifying one or more object patterns in the image map;

analyzing the one or more object patterns to identify one or more false positives in the initial locations of the plurality of objects;

removing the one or more false positives from the initial locations of the plurality of objects; and after removing the one or more false positives from the initial locations of the plurality of objects, applying a second object detection algorithm of the one or more object detection algorithms to each of the one or more object patterns to identify the locations of the plurality of objects.

10. The apparatus of claim 9, wherein the area of interest comprises a tree grove, the plurality of objects comprises a plurality of trees, and the one or more object patterns comprise one or more rows of trees.

11. The apparatus of claim 8, wherein the GPU-focused instance performs the object detection of the region of the image map by receiving input, via the interface, originating from a user, the input comprising at least one of the region within the image map, an object spacing identifying an average space between objects located in the region, or one or more blank areas found in the region to be skipped by the one or more object detection algorithms.

12. The apparatus of claim 8, wherein the area of interest comprises a tree grove, the plurality of objects comprise a plurality of trees, and the one or more cloud-based actions comprise:
  generating processing data for the plurality of trees, the processing data comprising at least one of a total number of trees for the plurality of trees, one or more tree gap counts, an average value of tree heights, a tree height for one or more of the plurality of trees, a canopy area estimation for one or more of the plurality of trees, a yield estimation of fruit for one or more of the plurality of trees, an estimation of tree ages for one or more of the plurality of trees, an estimation of tree health for one or more of the plurality of trees, estimated nutrient concentrations for one or more of the plurality of trees, or a fertility map based at least in part on estimate nutrient concentrations for the plurality of trees; and
  providing at least a portion of the processing data for display via the interface on a user device.

13. The apparatus of claim 12, wherein the one or more cloud-based actions comprise:
  receiving an input indicating a selection of the region from a user via the user device; and
  responsive to receiving the input indicating the selection of the region, providing a map of the region for display via the interface on the user device, the map displaying the plurality of trees detected for the region.

14. The apparatus of claim 8, wherein the area of interest comprises a tree grove, the plurality of objects comprise a plurality of trees, and the one or more cloud-based actions comprise:
  generating an application map identifying an application rate for at least the region within the image map; and
  downloading the application map to a smart sprayer system configured to use the application map to control flow of a liquid being applied to the plurality of trees in the region.

15. A non-transitory computer storage medium comprising instructions for detecting a plurality of objects located in an area of interest, the instructions being configured to cause one or more processors operating within a general instance of a cloud environment to at least perform operations configured to:
  receive, via an interface, imaging data comprising a plurality of raw images collected on the area of interest;
  upon receiving the plurality of raw images:
    activate a central processing unit (CPU)-focused instance on the cloud environment based at least in part on a CPU-focused machine configuration image, wherein upon activating the CPU-focused instance, the CPU-focused instance processes the plurality of raw images to stitch together each of the raw images of the plurality of raw images to generate an image map of the area of interest; and
    upon completion of generating the image map, close the CPU-focused instance on the cloud environment; and
  after the image map is generated:
    activate a graphical processing unit (GPU)-focused instance on the cloud environment based at least in part on a GPU-focused machine configuration image, wherein upon activating the GPU-focused instance, the GPU-focused instance performs object detection on at least a region within the image map by applying one or more object detection algorithms to the region of the image map to identify locations of the plurality of objects in the region of the image map; and
    upon completion of detecting the plurality of objects for the region, close the GPU-focused instance on the cloud environment; and
  perform one or more cloud-based actions based at least in part on the plurality of objects detected for the region within the image map.

16. The non-transitory computer storage medium of claim 15, wherein the GPU-focused instance performs the object detection on the region within the image map by:
  preprocessing the image map to reduce variation in the image map resulting from capturing the plurality of raw images;
  applying a first object detection algorithm of the one or more object detection algorithms to identify initial locations of the plurality of objects in the region of the image map;
  identifying one or more object patterns in the image map;
  analyzing the one or more object patterns to identify one or more false positives in the initial locations of the plurality of objects;
  removing the one or more false positives from the initial locations of the plurality of objects; and
  after removing the one or more false positives from the initial locations of the plurality of objects, applying a second object detection algorithm of the one or more object detection algorithms to each of the one or more object patterns to identify the locations of the plurality of objects.

17. The non-transitory computer storage medium of claim 16, wherein the area of interest comprises a tree grove, the plurality of objects comprises a plurality of trees, and the one or more object patterns comprise one or more rows of trees.

18. The non-transitory computer storage medium of claim 15, wherein the GPU-focused instance performs the object detection of the region of the image map by receiving input, via the interface, originating from a user, the input comprising at least one of the region within the image map, an object spacing identifying an average space between objects located in the region, or one or more blank areas found in the region to be skipped by the one or more object detection algorithms.

19. The non-transitory computer storage medium of claim 15, wherein the area of interest comprises a tree grove, the plurality of objects comprise a plurality of trees, and the one or more cloud-based actions comprise:
  generating processing data for the plurality of trees, the processing data comprising at least one of a total number of trees for the plurality of trees, one or more tree gap counts, an average value of tree heights, a tree height for one or more of the plurality of trees, a canopy area estimation for one or more of the plurality of trees, a yield estimation of fruit for one or more of the plurality of trees, an estimation of tree ages for one or more of the plurality of trees, an estimation of tree health for one or more of the plurality of trees, estimated nutrient concentrations for one or more of the plurality of trees, or a fertility map based at least in part on estimated nutrient concentrations for the plurality of trees; and
  providing at least a portion of the processing data for display via the interface on a user device.

20. The non-transitory computer storage medium of claim 19, wherein the one or more cloud-based actions comprise:

receiving an input indicating a selection of the region from a user via the user device; and responsive to receiving the input indicating the selection of the region, providing a map of the region for display via the interface on the user device, the map displaying the plurality of trees detected for the region.

21. The non-transitory computer storage medium of claim 15, wherein the area of interest comprises a tree grove, the plurality of objects comprise a plurality of trees, and the one or more cloud-based actions comprise:

generating an application map identifying an application rate for at least the region within the image map; and downloading the application map to a smart sprayer system configured to use the application map to control flow of a liquid being applied to the plurality of trees in the region.

* * * * *